United States Patent
Wei et al.

(10) Patent No.: US 9,770,889 B2
(45) Date of Patent: Sep. 26, 2017

(54) COMPOSITE PLATE STRUCTURE AND FLEXIBLE APPARATUS

(71) Applicant: Industrial Technology Research Institute, Hsinchu (TW)

(72) Inventors: Hsiao-Fen Wei, New Taipei (TW); Kun-Lin Chuang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 458 days.

(21) Appl. No.: 14/623,500

(22) Filed: Feb. 17, 2015

(65) Prior Publication Data

US 2015/0231864 A1    Aug. 20, 2015

Related U.S. Application Data

(60) Provisional application No. 61/942,046, filed on Feb. 20, 2014.

(51) Int. Cl.
*B32B 27/28* (2006.01)
*B32B 7/06* (2006.01)
(Continued)

(52) U.S. Cl.
CPC .............. *B32B 27/281* (2013.01); *B32B 3/04* (2013.01); *B32B 7/06* (2013.01); *B32B 7/12* (2013.01);
(Continued)

(58) Field of Classification Search
None
See application file for complete search history.

(56) References Cited

U.S. PATENT DOCUMENTS

| 8,445,898 B2 | 5/2013 | Kim et al. |
| 8,492,974 B2 | 7/2013 | Lee et al. |

(Continued)

FOREIGN PATENT DOCUMENTS

| CN | 103325734 | 9/2013 | |
| EP | 0485213 A1 * | 5/1992 | ............ A01N 43/653 |

(Continued)

OTHER PUBLICATIONS

Kim et al., "Preparation and properties of hydrophobic layered silicate-reinforced UV-curable poly(urethane acrylate) nanocomposite films for packaging applications," Progress in Organic Coatings, Apr. 3, 2014, pp. 1045-1052.

(Continued)

*Primary Examiner* — Randy Gulakowski
*Assistant Examiner* — Ha S Nguyen
(74) *Attorney, Agent, or Firm* — Jianq Chyun IP Office (57) ABSTRACT

A composite plate structure including a flexible substrate and a release layer is provided. The flexible substrate has an upper surface and a lower surface. The release layer is disposed on the lower surface of the flexible substrate, and includes a hydrophobic material and a bonding material. The hydrophobic material includes at least one fluorine atom. The bonding material at least includes an amide functional group or an epoxy functional group. The bonding material is bonded to the flexible substrate through the amide functional group or the epoxy functional group. A flexible apparatus including the composite plate structure is also provided.

18 Claims, 9 Drawing Sheets

(51) Int. Cl.

| | | |
|---|---|---|
| *B32B 3/04* | (2006.01) | |
| *B32B 27/08* | (2006.01) | |
| *B32B 7/12* | (2006.01) | |
| *B32B 27/34* | (2006.01) | |
| *B32B 27/38* | (2006.01) | |
| *B32B 37/26* | (2006.01) | |
| *C08K 3/32* | (2006.01) | |
| *C08K 5/5435* | (2006.01) | |
| *C08K 5/3415* | (2006.01) | |
| *C08K 5/42* | (2006.01) | |
| *C08K 5/56* | (2006.01) | |
| *C08K 5/544* | (2006.01) | |
| *C08K 5/07* | (2006.01) | |
| *C08K 3/36* | (2006.01) | |
| *C08K 3/22* | (2006.01) | |

(52) U.S. Cl.
CPC ............ *B32B 27/08* (2013.01); *B32B 27/34* (2013.01); *B32B 27/38* (2013.01); *C08K 3/22* (2013.01); *C08K 3/36* (2013.01); *C08K 5/07* (2013.01); *C08K 5/3415* (2013.01); *C08K 5/42* (2013.01); *C08K 5/5435* (2013.01); *C08K 5/5442* (2013.01); *C08K 5/56* (2013.01); *B32B 2264/102* (2013.01); *B32B 2307/7244* (2013.01); *B32B 2307/7265* (2013.01); *B32B 2307/73* (2013.01); *B32B 2307/748* (2013.01); *C08K 2003/2227* (2013.01); *Y10T 428/31511* (2015.04); *Y10T 428/31663* (2015.04); *Y10T 428/31721* (2015.04); *Y10T 428/31725* (2015.04); *Y10T 428/31765* (2015.04)

(56) References Cited

U.S. PATENT DOCUMENTS

| | | |
|---|---|---|
| 2012/0042420 A1 | 2/2012 | Kaiser et al. |
| 2012/0114910 A1 | 5/2012 | Ju et al. |
| 2013/0320510 A1 | 12/2013 | Kobrin et al. |
| 2014/0063424 A1 | 3/2014 | Sung et al. |

FOREIGN PATENT DOCUMENTS

| | | | |
|---|---|---|---|
| JP | 2012079884 A | * | 4/2012 |
| TW | 200742897 | | 11/2007 |
| TW | 201326877 | | 7/2013 |
| TW | I425463 | | 2/2014 |

OTHER PUBLICATIONS

Kim et al., "Hydrophobic barrier: Molecular self-assembly of amphiphilic polyacetylenes within aluminosilicate nanoplatelets," Journal of Membrane Science, Apr. 20, 2006, pp. 12-16.

Ali et al., "Hydrophobicity enhancement of Al2O3 thin films deposited on polymeric substrates by atomic layer deposition with perfluoropropane plasma treatment," Applied Surface Science, Mar. 30, 2014, pp. 554-561.

Suciu et al., "Novel and global approach of the complex and interconnected phenomena related to the contact line movement past a solid surface from hydrophobized silica gel," Journal of Colloid and Interface Science, Mar. 1, 2005, pp. 196-214.

Kim et al., "Improvement of hydrophobic properties of polymer surfaces by plasma source ion implantation," Surface and Coatings Technology, Apr. 27, 2006, pp. 4763-4769.

* cited by examiner

FIG. 15

COMPOSITE PLATE STRUCTURE AND FLEXIBLE APPARATUS

CROSS-REFERENCE TO RELATED APPLICATION

This application claims the priority benefits of U.S. provisional application Ser. No. 61/942,046, filed on Feb. 20, 2014. The entirety of the above-mentioned patent application is hereby incorporated by reference herein and made a part of this specification.

TECHNICAL FIELD

The disclosure relates to a composite plate structure and a flexible apparatus including the composite plate structure.

BACKGROUND

In general, when a flexible apparatus is manufactured, a flexible substrate may be used to achieve the flexible characteristic thereof. To manufacture a flexible device on the flexible substrate, the flexible substrate may be adhered onto a rigid carrier plate or machine to provide suitable support via the carrier plate or machine. In current techniques, the flexible substrate and the rigid carrier plate are bonded via a release layer. The flexible substrate can be peeled from the rigid carrier plate after the manufacture of the flexible device is complete. Since the adhesion of the release layer and the flexible substrate is not good, the release layer remains on the rigid carrier plate when peeled therefrom. To increase the effectiveness of a flexible product, how to more effectively adopt release layer techniques is an important current topic.

SUMMARY

A composite plate structure of an embodiment of the disclosure includes a flexible substrate and a release layer. The flexible substrate has an upper surface and a lower surface. The release layer is disposed on the lower surface of the flexible substrate, and includes a hydrophobic material and a bonding material. The hydrophobic material includes at least one fluorine atom. The bonding material at least includes an amide functional group or an epoxy functional group. The bonding material is bonded to the flexible substrate through the amide functional group or the epoxy functional group.

A flexible apparatus of another embodiment of the disclosure includes a flexible substrate, a device layer, and a release layer. The flexible substrate has an upper surface and a lower surface. The device layer is disposed on the upper surface of the flexible substrate. The release layer is disposed on the lower surface of the flexible substrate, and includes a hydrophobic material and a bonding material. The hydrophobic material includes at least one fluorine atom. The bonding material at least includes an amide functional group or an epoxy functional group. The bonding material is bonded to the flexible substrate through the amide functional group or the epoxy functional group.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
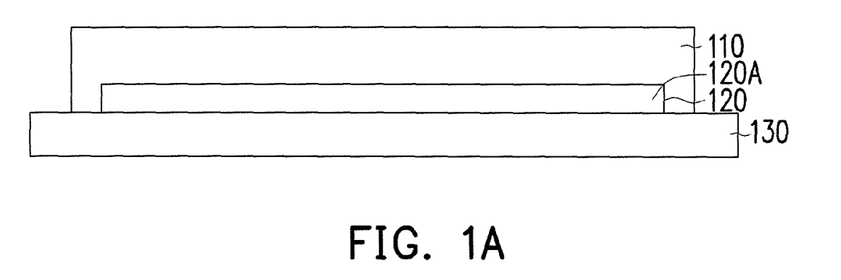
FIG. 1A is a composite plate structure according to an embodiment of the disclosure.
Figure 1B:
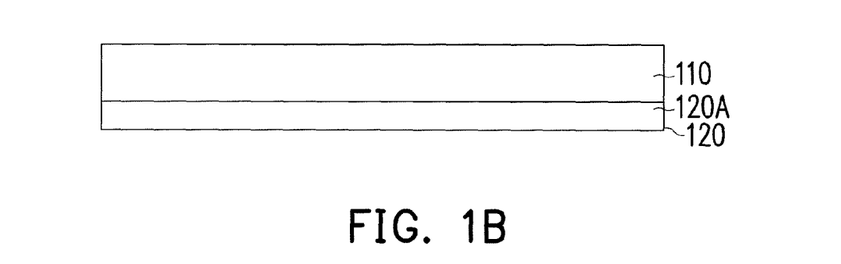
FIG. 1B is a composite plate structure after the flexible substrate of FIG. 1A is peeled from the carrier plate.

FIG. 1A is a composite plate structure according to an embodiment of the disclosure. FIG. 1B is a composite plate structure after the flexible substrate of FIG. 1A is peeled from the carrier plate. Referring first to FIG. 1A, the composite plate structure includes a flexible substrate 110, a release layer 120, and a carrier plate 130. In the present embodiment, the release layer 120 is formed on the carrier plate 130, and the flexible substrate 110 is formed on the release layer 120. In other words, the flexible substrate 110 has an upper surface and a lower surface, and the release layer 120 is disposed on the lower surface of the flexible substrate 110 and located between the flexible substrate 110 and the carrier plate 130. The material of the flexible substrate 110 includes polyimide or poly(amic) acid. The material of the release layer 120 includes a hydrophobic material 120A and a bonding material (not shown). The hydrophobic material 120A includes a material having a fluorine atom, and therefore can provide waterproof efficacy to the composite plate structure. Based on the above, the hydrophobic material 120A may include at least one of formula 1 to formula 2 below:

(formula 1)

(formula 6)

The bonding material having an epoxy functional group includes at least one of formula 7 to formula 12 below:

(formula 7)

(formula 8)

(formula 9)

(formula 10)

(formula 11)

(formula 12)

(formula 2)

The bonding material includes an amide functional group or an epoxy functional group. The bonding material having an amide functional group includes at least one of formula 3 to formula 6 below:

(formula 3)

(formula 4)

(formula 5)

The bonding material may be bonded to the flexible substrate 110 through the amide functional group or the epoxy functional group. For instance, when the flexible substrate 110 is polyamic acid, the release layer 120 may react with an amine group or hydroxyl group (NH—OH) on polyamic acid through the amide functional group or the epoxy functional group to form a chemical bond. The epoxy functional group is readily opened an epoxy ring and may therefore react with polyamic acid to form a bond. Based on the above, when the release layer 120 is bonded to polyamic acid, a ring-closing reaction can be performed on the polyamic acid through a heating process to form a polyimide release layer 120. Moreover, when the flexible substrate 110 is polyimide, the release layer 120 can form a hydrogen bond with an oxygen atom of polyimide through the amide functional group, or form a hydrogen bond with an amine group (NH) of polyimide through an oxygen atom of the epoxy functional group, such that the release layer 120 is bonded to the flexible substrate 110. Since the release layer 120 is bonded to the flexible substrate 110 through the bonding material, the affinity of the release layer 120 and the flexible substrate 110 is higher than the affinity of the release layer 120 and the carrier plate 130. In the composite plate structure of the present embodiment, a subsequent device process can be further performed above the flexible substrate 110, such as forming a flexible device, but is not limited thereto.

Referring to FIG. 1B, if the flexible substrate 110 is directly peeled from the carrier plate 130 without performing a device process above the flexible substrate 110, the composite plate structure shown in, for instance, FIG. 1B, is formed. Since the release layer 120 is bonded to the flexible substrate 110 through the bonding material, when the flexible substrate 110 is peeled from the carrier plate 130, the release layer 120 and the flexible substrate 110 are separated from the carrier plate 130 together. In other words, the release layer 120 including the hydrophobic material 120A can provide waterproof efficacy to the composite plate structure of FIG. 1B.

Figure 2A:
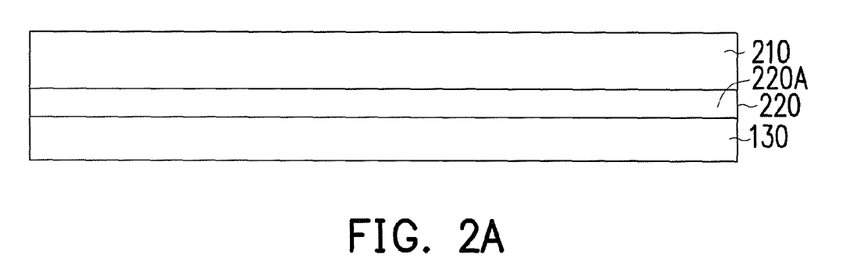
FIG. 2A is a composite plate structure according to another embodiment of the disclosure.
Figure 2B:
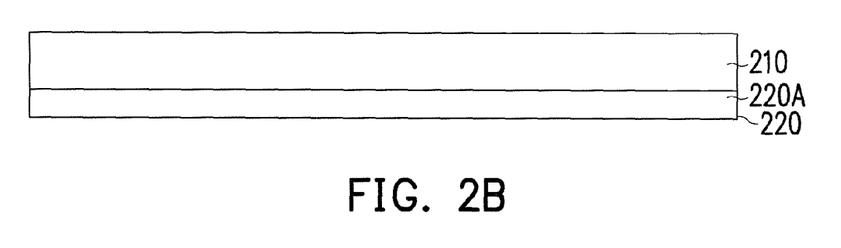
FIG. 2B is a composite plate structure after the flexible substrate of FIG. 2A is peeled from the carrier plate.

FIG. 2A is a composite plate structure according to another embodiment of the disclosure. FIG. 2B is a composite plate structure after the flexible substrate of FIG. 2A is peeled from the carrier plate. Referring first to FIG. 2A, the composite plate structure includes a flexible substrate 210, a release layer 220, and a carrier plate 130. In the present embodiment, the release layer 220 is formed on the carrier plate 130, and the flexible substrate 210 is formed on the release layer 220. Moreover, the flexible substrate 210 and the release layer 220 completely cover the carrier plate 130. The flexible substrate 210 has an upper surface and a lower surface, and the release layer 220 is disposed on the lower surface of the flexible substrate 210 and located between the flexible substrate 210 and the carrier plate 130. The material of the flexible substrate 210 includes polyimide or poly(amic) acid. The material of the release layer 220 includes a hydrophobic material 220A and a bonding material (not shown). The hydrophobic material 220A includes a material having a fluorine atom, and therefore can provide waterproof efficacy to the composite plate structure. Moreover, the hydrophobic material 220A and the bonding material of the present embodiment can be similar to the hydrophobic material 120A and the bonding material of the embodiments of FIG. 1A and FIG. 1B, and are therefore not repeated herein. Since the release layer 220 is bonded to the flexible substrate 210 through the bonding material, when the flexible substrate 210 is peeled from the carrier plate 130, the release layer 220 and the flexible substrate 210 are separated from the carrier plate 130 together. In other words, the release layer 220 including the hydrophobic material 220A can provide waterproof efficacy to the composite plate structure of FIG. 2B.

Figure 3A:
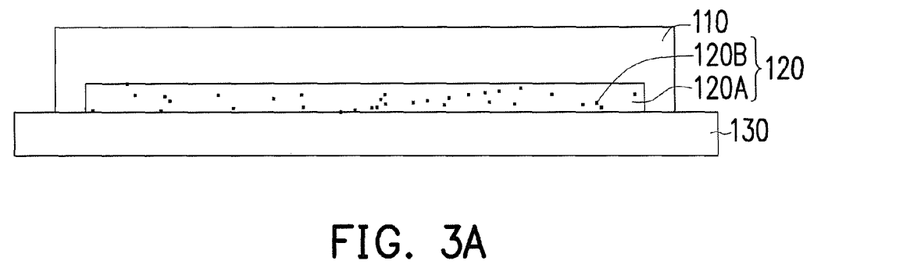
FIG. 3A is a composite plate structure according to another embodiment of the disclosure.
Figure 3B:
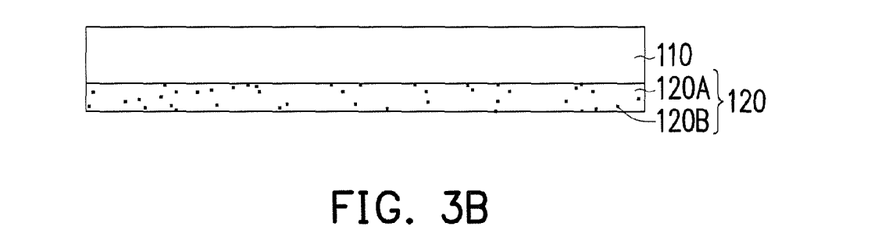
FIG. 3B is a composite plate structure after the flexible substrate of FIG. 3A is peeled from the carrier plate.

FIG. 3A is a composite plate structure according to another embodiment of the disclosure. FIG. 3B is a composite plate structure after the flexible substrate of FIG. 3A is peeled from the carrier plate. The embodiments of FIG. 3A and FIG. 3B are similar to the embodiments of FIG. 1A and FIG. 1B, and therefore the same devices are represented by the same reference numerals and are not repeated herein. The release layer 120 of each of the composite plate structures shown in FIGS. 3A and 3B further includes a plurality of nanoparticles 120B disposed in the release layer 120 of the hydrophobic material 120A. The nanoparticles 120B can include silicon oxide or aluminum oxide nanoparticles, but are not limited thereto. In particular, the silicon oxide or aluminum oxide nanoparticles can be formed by, for instance, a sol-gel method, and can be formed into a film with the hydrophobic material 120A through curing.

In an embodiment, silicon oxide nanoparticles can be formed via, for instance, compounds having silicon shown in formula 7 to formula 12 in a sol-gel method. Specifically, the compounds of formula 7 to formula 12 each include a silane functional group, and therefore can be used in a hydrolysis and condensation reaction to form silicon oxide nanoparticles. In other words, the compounds shown in formula 7 to formula 12 can be used as both the bonding material and the nanoparticles 120B. Based on the above, the hydrophobic material 120A has hydrophobic function, and can be used to reduce contact with water vapor, and the nanoparticles 120B can extend the penetrating path of, for instance, water and oxygen, and can provide the functions of water blocking and gas blocking. Moreover, when the flexible substrate 110 is peeled from the carrier plate 130, the release layer 120 and the flexible substrate 110 are separated from the carrier plate 130 together to form the composite plate structure shown in, for instance, FIG. 3B. Although the release layer 120 of the present embodiment is currently shown to have an area less than those of the flexible substrate 110 and the carrier plate 130, the disclosure is not limited thereto. For instance, the composite plate structure of the present embodiment can also be similar to the composite plate structures shown in the embodiments of FIG. 2A and FIG. 2B, such that the flexible substrate 110 and the release layer 120 completely cover the carrier plate 130.

Figure 4A:
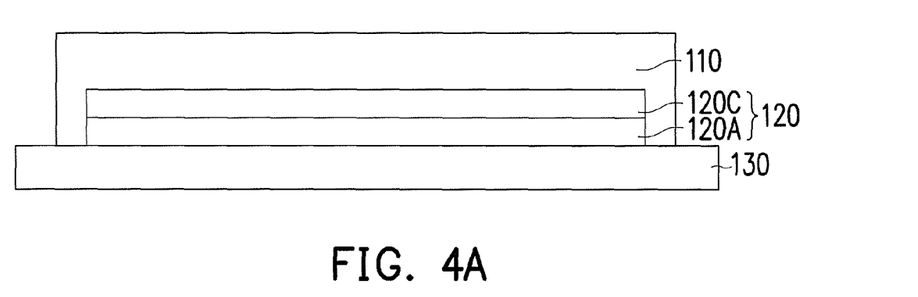
FIG. 4A is a composite plate structure according to another embodiment of the disclosure.
Figure 4B:
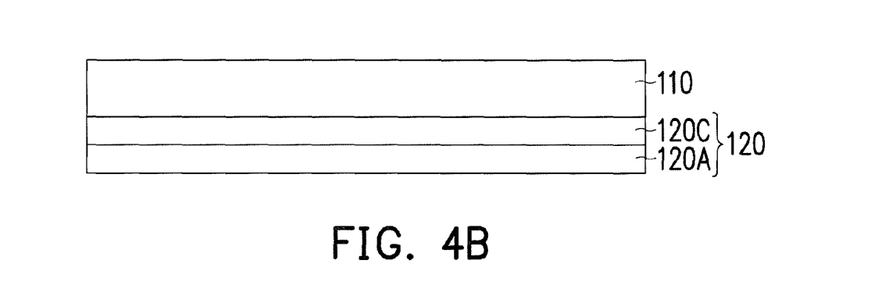
FIG. 4B is a composite plate structure after the flexible substrate of FIG. 4A is peeled from the carrier plate.

FIG. 4A is a composite plate structure according to another embodiment of the disclosure. FIG. 4B is a composite plate structure after the flexible substrate of FIG. 4A is peeled from the carrier plate. The embodiments of FIG. 4A and FIG. 4B are similar to the embodiments of FIG. 1A and FIG. 1B, and therefore the same devices are represented by the same reference numerals and are not repeated herein. The release layer 120 of each of the composite plate structures shown in FIGS. 4A and 4B further includes a water-blocking material 120C, and the water-blocking material 120C and the hydrophobic material 120A form a stacked layer. The water-blocking material 120C can be an inorganic material including metal, silicon oxide, or silicon nitride, but is not limited thereto. In the present embodiment, the hydrophobic material 120A has hydrophobic function, and can be used to reduce contact with water vapor, and the water-blocking material 120C can provide the functions of water blocking and gas blocking. Moreover, when the flexible substrate 110 is peeled from the carrier plate 130, the release layer 120 and the flexible substrate 110 are separated from the carrier plate 130 together to form the composite plate structure shown in, for instance, FIG. 4B. Although the release layer 120 of the present embodiment is currently shown to have an area less than those of the flexible substrate 110 and the carrier plate 130, the disclosure is not limited thereto. For instance, the composite plate structure of the present embodiment can also be similar to the composite plate structures shown in the embodiments of FIG. 2A and FIG. 2B, such that the flexible substrate 110 and the release layer 120 completely cover the carrier plate 130.

Figure 5:
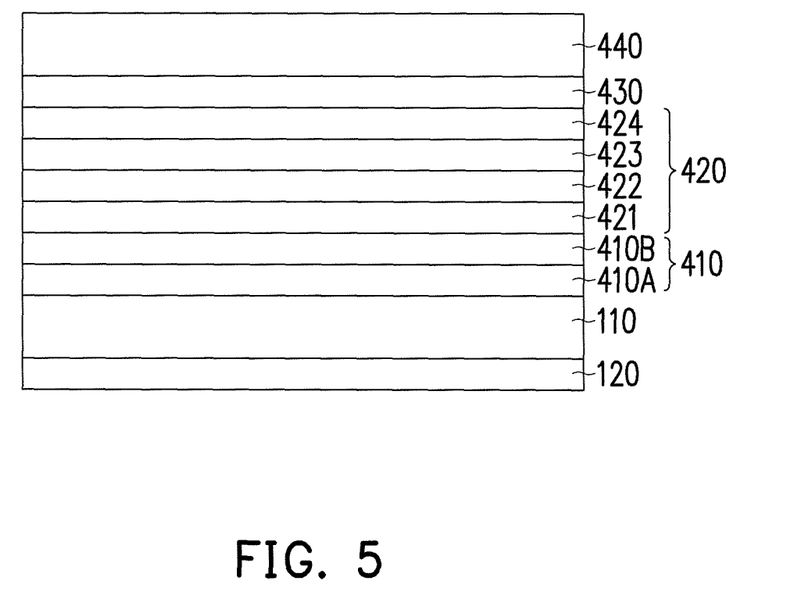
FIG. 5 is a flexible apparatus according to an embodiment of the disclosure.

FIG. 5 is a flexible apparatus according to an embodiment of the disclosure. Referring to FIG. 5, the flexible apparatus includes a flexible substrate 110, a release layer 120, a waterproof layer 410, a device layer 420, an adhesive layer 430, and a cover 440. A flexible apparatus 400 shown in FIG. 5 can include the composite plate structure peeled from the carrier plate 130 selected from FIG. 1B, FIG. 2B, FIG. 3B, or FIG. 4B. For instance, the flexible substrate 110 shown in FIG. 5 has an upper surface and a lower surface, and the material of the flexible substrate 110 includes polyimide or polyamic acid. The release layer 120 shown in FIG. 5 is disposed on the lower surface of the flexible substrate 110, and can be selected from the release layers 120 and 220 of FIG. 1, FIG. 2, FIG. 3, or FIG. 4. Alternatively, the release layer 120 can be formed through a combination of the hydrophobic materials 120A and 220A, the nanoparticles 120B, and the water-blocking material 120C as needed. Moreover, the features and efficacies of the release layer 120 of FIG. 5 are similar to those of the release layers 120 and 220 shown in FIG. 1, FIG. 2, FIG. 3, or FIG. 4, and are therefore not repeated herein.

In the present embodiment, the waterproof layer 410 is disposed on the upper surface of the flexible substrate 110. The waterproof layer 410 can include, for instance, a hydrophobic material 410A and a water-blocking material 410B, and the hydrophobic material 410A and the water-blocking material 410B form a stacked layer. The hydrophobic material 410A and the water-blocking material 410B of the waterproof layer 410 can be the same as the hydrophobic material 120A and the water-blocking material 120C of the release layer 120, but are not limited thereto. The device layer 420 is disposed on the upper surface of the flexible substrate 110 and can be located above the waterproof layer 410. The device layer 420 includes, for instance, a buffer layer 421, a thin film transistor layer 422, an organic light-emitting device layer 423, and an encapsulating layer 424. The adhesive layer 430 can be disposed above the device layer 420 to adhere the device layer 420 and the cover 440. The cover 440 can include, for instance, a flexible cover material. The waterproof layer 410 of the present embodiment is disposed between the device layer 420 and the flexible substrate 110, and includes a hydrophobic material 410A and a water-blocking material 410B, and can further strengthen the functions of waterproofing, water blocking, oxygen blocking, and antifouling of the flexible apparatus.

In the present embodiment, the device layer 420 is exemplified by an organic light-emitting diode (OLED) device, but is not limited thereto. In other embodiments, the device layer 420 can also be the device layer of a liquid crystal display panel (including a device such as a pixel structure), the device layer of a touch panel structure (including a device such as a touch electrode layer), or the device layer of other electronic apparatuses. Of course, the present text does not limit the device layer 420 to be the device layer of an electronic apparatus, and the device layer 420 can also be the device layer of other non-electronic apparatuses.

Figure 6A:
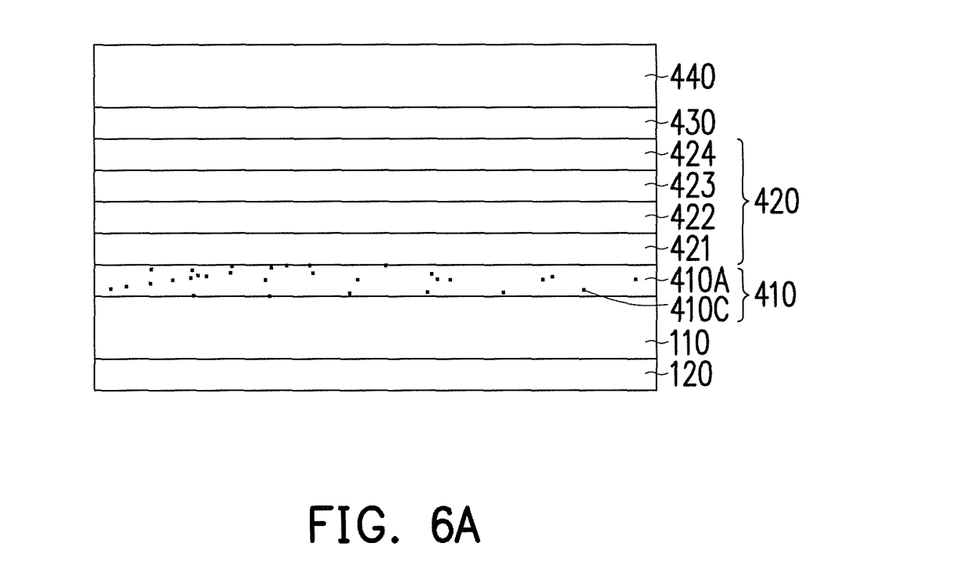
FIGS. 6A to 6C are flexible apparatuses according to another embodiment of the disclosure.
Figure 6B:
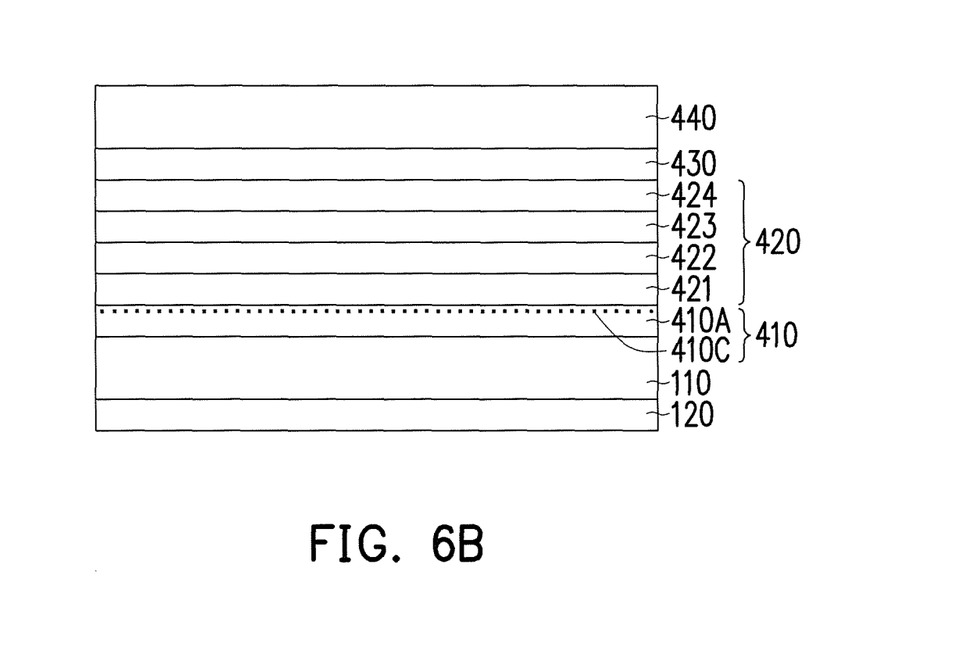
Figure 6C:
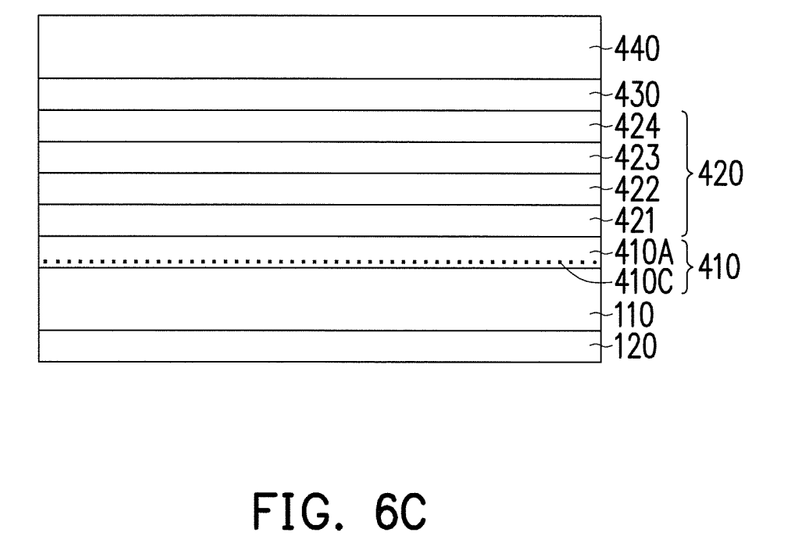

FIG. 6A, FIG. 6B, and FIG. 6C are flexible apparatuses according to other embodiments in the disclosure. The embodiments shown in FIG. 6A, FIG. 6B, and FIG. 6C are similar to the embodiment shown in FIG. 5, and therefore the same devices are represented by the same reference numerals and are not repeated herein. The waterproof layer 410 shown in FIG. 6A includes a plurality of nanoparticles 410C located in the hydrophobic material 410A. The nanoparticles 410C of FIG. 6A can include silicon oxide or aluminum oxide nanoparticles, but are not limited thereto. Based on the above, the silicon oxide or aluminum oxide nanoparticles can be formed by, for instance, a sol-gel method, and can be formed into a film with the hydrophobic material 410A through curing. The waterproof layer 410 of FIG. 6A is disposed between the device layer 420 and the flexible substrate 110, and includes a hydrophobic material 410A and a plurality of nanoparticles 410C, and can further strengthen the functions of waterproofing, water blocking, oxygen blocking, and antifouling of the flexible apparatus.

The flexible apparatuses of FIG. 6B and FIG. 6C are similar to the flexible apparatus of FIG. 6A. In the embodiment of FIG. 6A, the nanoparticles 410C are randomly arranged in the hydrophobic material 410A. In the embodiment of FIG. 6B, the nanoparticles 410C are arranged on one surface away from the flexible substrate 110. In the embodiment of FIG. 6C, the nanoparticles 410C are arranged on one surface close to the flexible substrate 110. According to the above embodiments, those skilled in the art can adjust the arrangement of the nanoparticles 410C according to requirements of different flexible apparatuses to delay the paths of water and oxygen penetrating the waterproof layer 410 and achieve the effects of water blocking and gas blocking. Moreover, the waterproof layer 410 of each of FIGS. 6A to 6C is disposed between the device layer 420 and the flexible substrate 110, and includes a hydrophobic material 410A and nanoparticles 410C, and can further strengthen the functions of waterproofing, water blocking, oxygen blocking, and antifouling of the flexible apparatus.

Figure 7:
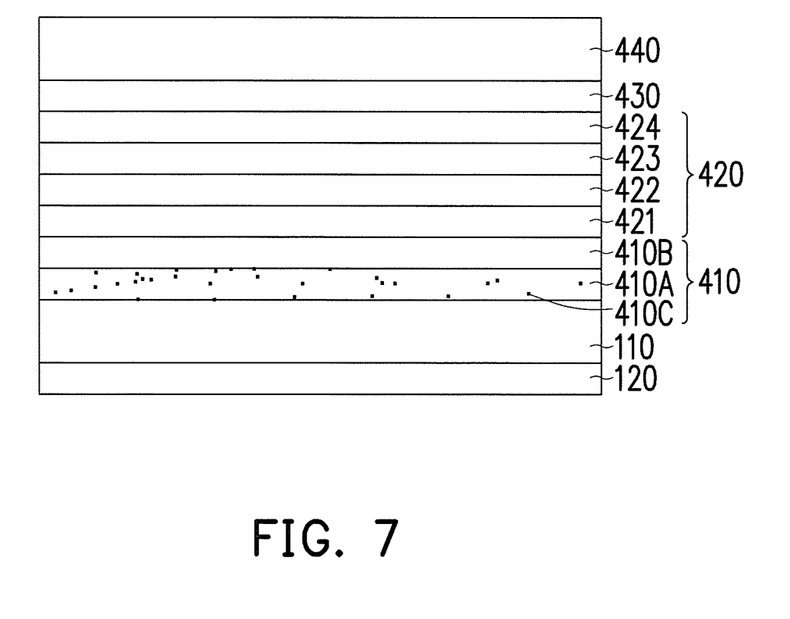
FIG. 7 is a flexible apparatus according to another embodiment of the disclosure.

FIG. 7 is a flexible apparatus according to another embodiment of the disclosure. The embodiment shown in FIG. 7 is similar to the embodiment shown in FIG. 5, and therefore the same devices are represented by the same reference numerals and are not repeated herein. The waterproof layer 410 shown in FIG. 7 includes a hydrophobic material 410A, a water-blocking material 410B, and a plurality of nanoparticles 410C located in the hydrophobic material 410A. The nanoparticles 410C of FIG. 7 can include silicon oxide or aluminum oxide nanoparticles, but are not limited thereto. Based on the above, the silicon oxide or aluminum oxide nanoparticles can be formed by, for instance, a sol-gel method, and can be formed into a film with the hydrophobic material 410A through curing. The waterproof layer 410 of FIG. 7 is disposed between the device layer 420 and the flexible substrate 110, and includes a hydrophobic material 410A, a water-blocking material 410B, and a plurality of nanoparticles 410C, and can further strengthen the functions of waterproofing, water blocking, oxygen blocking, and antifouling of the flexible apparatus.

Figure 8:
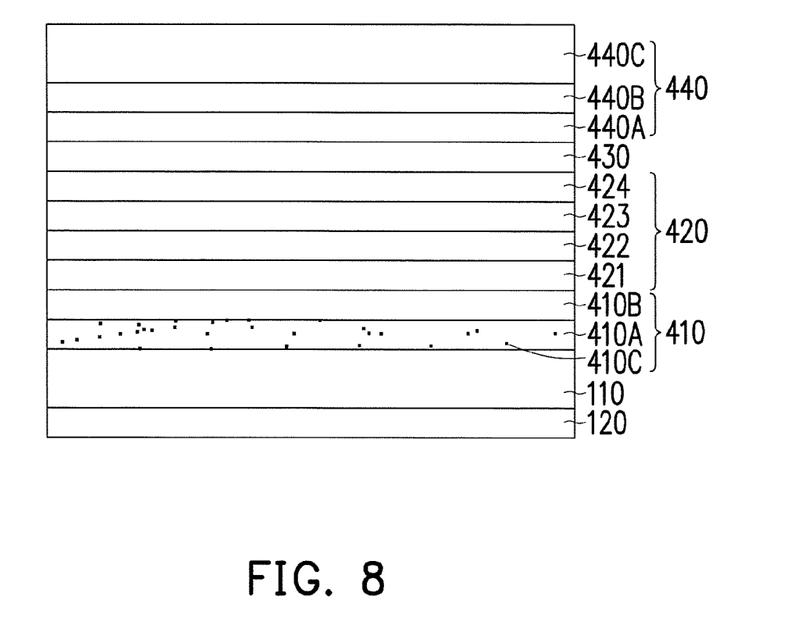
FIG. 8 is a flexible apparatus according to another embodiment of the disclosure.

FIG. 8 is a flexible apparatus according to another embodiment of the disclosure. The embodiment shown in FIG. 8 is similar to the embodiment shown in FIG. 7, and therefore the same devices are represented by the same reference numerals and are not repeated herein. The cover 440 shown in FIG. 8 further includes a water-blocking material 440A, a hydrophobic material 440B, and a flexible cover 440C, and the water-blocking material 440A and the hydrophobic material 440B can form a stacked layer. The water-blocking material 440A and the hydrophobic material 440B of the cover 440 can be the same as the hydrophobic material 120A and the water-blocking material 120C of the release layer 120, but are not limited thereto. The cover 440 of the present embodiment is disposed above the device layer 420 and includes a water-blocking material 440A and a hydrophobic material 440B, and can further strengthen the functions of waterproofing, water blocking, oxygen blocking, and antifouling of the flexible apparatus.

Figure 9:
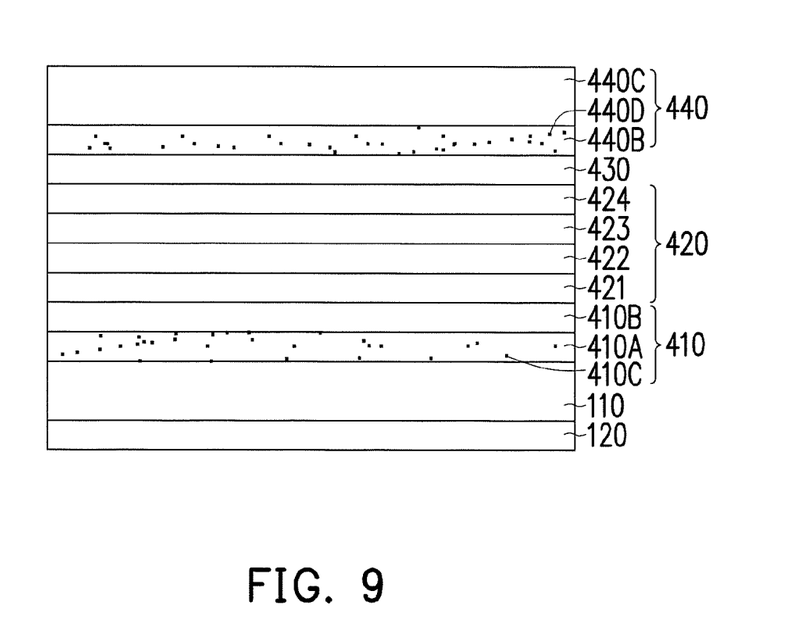
FIG. 9 is a flexible apparatus according to another embodiment of the disclosure.

FIG. 9 is a flexible apparatus according to another embodiment of the disclosure. The embodiment shown in FIG. 9 is similar to the embodiment shown in FIG. 8, and therefore the same devices are represented by the same reference numerals and are not repeated herein. The cover 440 shown in FIG. 9 includes a hydrophobic material 440B, a flexible cover 440C, and a plurality of nanoparticles 440D located in the hydrophobic material 440B. The nanoparticles 440D of FIG. 9 can include silicon oxide or aluminum oxide nanoparticles, but are not limited thereto. Based on the above, the silicon oxide or aluminum oxide nanoparticles can be formed by, for instance, a sol-gel method, and can be formed into a film with the hydrophobic material 440B through curing. The cover 440 of FIG. 9 is disposed above the device layer 420 and includes a hydrophobic material 440B and nanoparticles 440D, and can further strengthen the functions of waterproofing, water blocking, oxygen blocking, and antifouling of the flexible apparatus.

Figure 10:
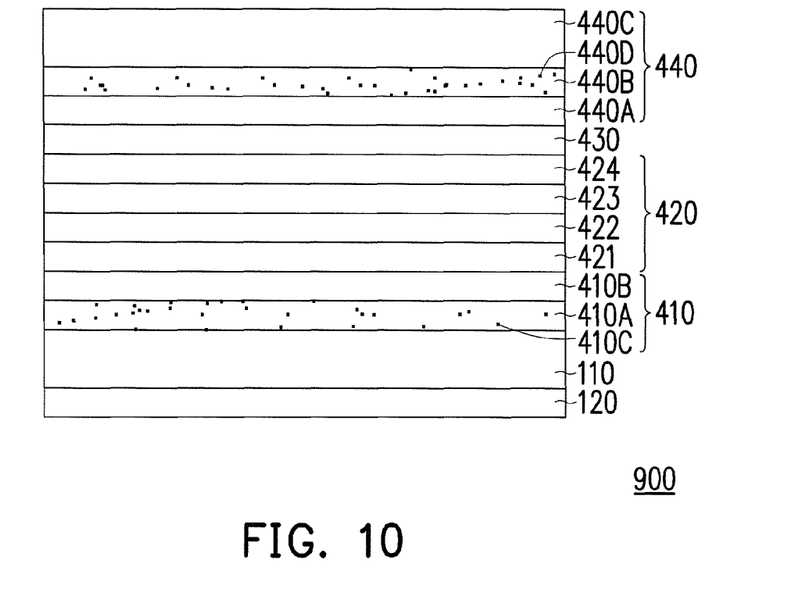
FIG. 10 is a flexible apparatus according to another embodiment of the disclosure.

FIG. 10 is a flexible apparatus according to another embodiment of the disclosure. The embodiment shown in FIG. 10 is similar to the embodiment shown in FIG. 8, and therefore the same devices are represented by the same reference numerals and are not repeated herein. The cover 440 shown in FIG. 10 further includes a plurality of nanoparticles 440D located in the hydrophobic material 440B. The nanoparticles 440D of FIG. 10 can include silicon oxide or aluminum oxide nanoparticles, but are not limited thereto. Based on the above, the silicon oxide or aluminum oxide nanoparticles can be formed by, for instance, a sol-gel method, and can be formed into a film with the hydrophobic material 440B through curing. The cover 440 of FIG. 10 is disposed above the device layer 420 and includes a water-blocking material 440A, a hydrophobic material 440B, and nanoparticles 440D, and can further strengthen the functions of waterproofing, water blocking, oxygen blocking, and antifouling of the flexible apparatus.

Figure 11:
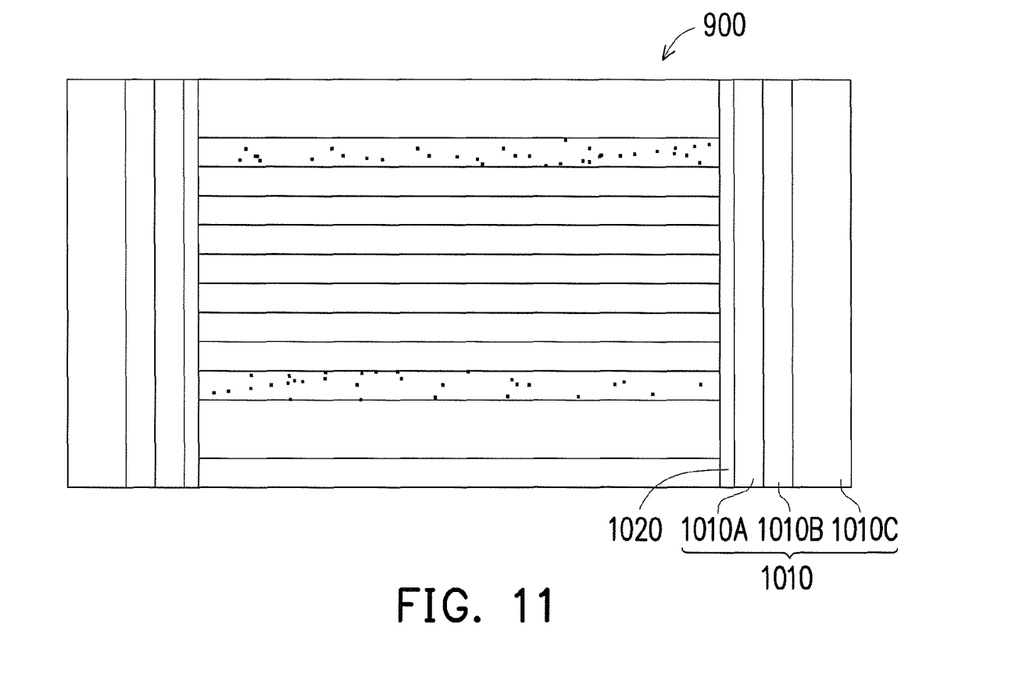
FIG. 11 is a flexible apparatus according to another embodiment of the disclosure.

FIG. 11 is a flexible apparatus according to another embodiment of the disclosure. The embodiment shown in FIG. 11 includes a flexible apparatus 900 shown in FIG. 10, and therefore the same devices are omitted and not repeated herein. The flexible apparatus shown in FIG. 11 further includes at least one side cover 1010 covering at least one side of the flexible apparatus 900. The side cover 1010 includes a hydrophobic material 1010A, a water-blocking material 1010B, and a flexible cover 1010C, and the hydrophobic material 1010A and the water-blocking material 101B form a stacked layer. The side cover 1010 is adhered to the flexible apparatus 900 through an adhesive layer 1020. The hydrophobic material 1010A and the water-blocking material 1010B of the side cover 1010 can be the same as the hydrophobic material 120A and the water-blocking material 120C of the release layer 120, but are not limited thereto. The side cover 1010 of FIG. 11 is disposed on at least one side of the flexible apparatus 900 and includes a hydrophobic material 1010A and a water-blocking material 1010B, and can further strengthen the functions of waterproofing, water blocking, oxygen blocking, and antifouling of the flexible apparatus.

Figure 12:
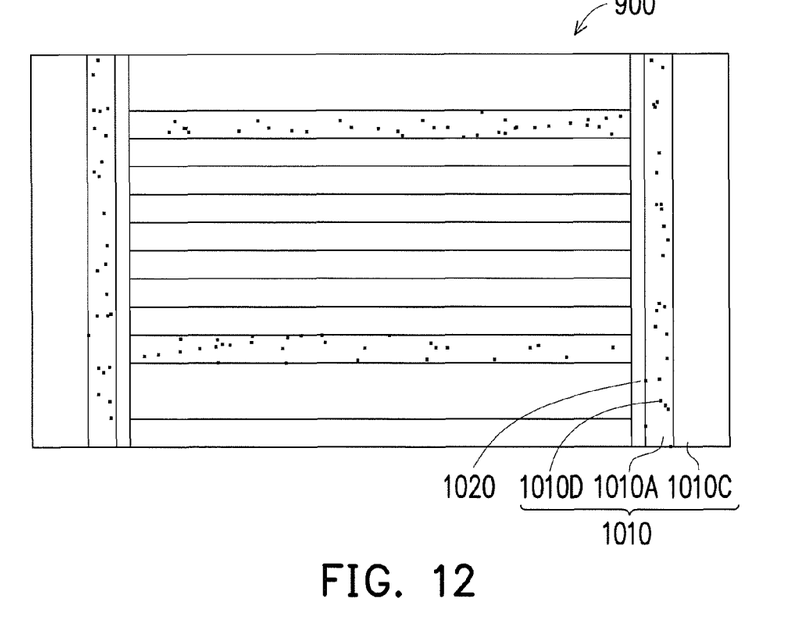
FIG. 12 is a flexible apparatus according to another embodiment of the disclosure.

FIG. 12 is a flexible apparatus according to another embodiment of the disclosure. The embodiment shown in FIG. 12 is similar to the embodiment shown in FIG. 11, and therefore the same devices are represented by the same reference numerals and are not repeated herein. The side cover 1010 shown in FIG. 12 includes a hydrophobic material 1010A, a flexible cover 1010C, and a plurality of nanoparticles 1010D located in the hydrophobic material 1010A. The nanoparticles 1010D of FIG. 12 can include silicon oxide or aluminum oxide nanoparticles, but are not limited thereto. Based on the above, the silicon oxide or aluminum oxide nanoparticles can be formed by, for instance, a sol-gel method, and can be formed into a film with the hydrophobic material 1010A through curing. The side cover 1010 of FIG. 12 is disposed on at least one side of the flexible apparatus 900 and includes a hydrophobic material 1010A and nanoparticles 1010D, and can further strengthen the functions of waterproofing, water blocking, oxygen blocking, and antifouling of the flexible apparatus.

Figure 13:
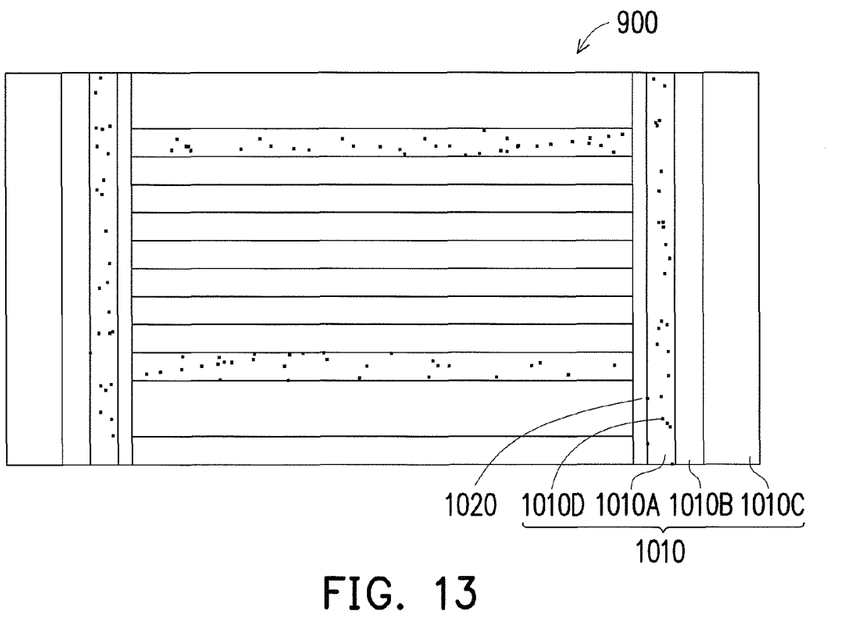
FIG. 13 is a flexible apparatus according to another embodiment of the disclosure.

FIG. 13 is a flexible apparatus according to another embodiment of the disclosure. The embodiment shown in FIG. 13 is similar to the embodiment shown in FIG. 11, and therefore the same devices are represented by the same reference numerals and are not repeated herein. The side cover 1010 shown in FIG. 13 includes a hydrophobic material 1010A, a water-blocking material 1010B, a flexible cover 1010C, and a plurality of nanoparticles 1010D located in the hydrophobic material 101 OA. The nanoparticles 101 OD of FIG. 13 can include silicon oxide or aluminum oxide nanoparticles, but are not limited thereto. Based on the above, the silicon oxide or aluminum oxide nanoparticles can be formed by, for instance, a sol-gel method, and can be formed into a film with the hydrophobic material 101 OA through curing. The side cover 1010 of FIG. 13 is disposed on at least one side of the flexible apparatus 900 and includes a hydrophobic material 1010A, a water-blocking material 1010B, and nanoparticles 1010D, and can further strengthen the functions of waterproofing, water blocking, oxygen blocking, and antifouling of the flexible apparatus.

Figure 14:
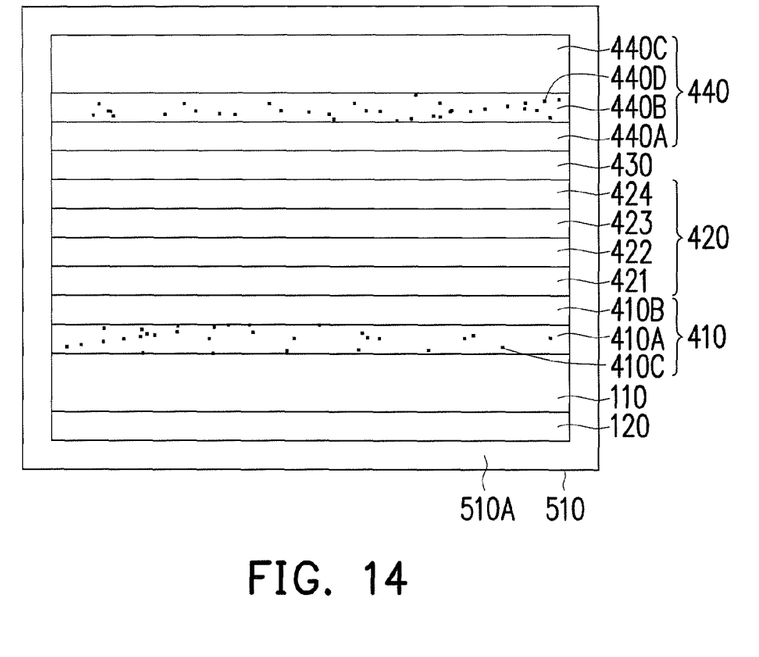
FIG. 14 is a flexible apparatus according to another embodiment of the disclosure.

FIG. 14 is a flexible apparatus according to another embodiment of the disclosure. The embodiment shown in FIG. 14 is similar to the embodiment shown in FIG. 10, and therefore the same devices are represented by the same reference numerals and are not repeated herein. The flexible apparatus shown in FIG. 14 further includes a waterproof thin film 510, and the waterproof thin film 510 completely covers, for instance, the outside of the flexible apparatus 900 of FIG. 10. The waterproof thin film 510 can include a hydrophobic material 51 OA, and the hydrophobic material 51 OA can be the same as the hydrophobic material 120A of the release layer 120, but is not limited thereto. In the present embodiment, the flexible apparatus 900 shown in, for instance, FIG. 10, is dipped in a solution of the hydrophobic material 510A such that the hydrophobic material 510A can completely cover the flexible apparatus 900 after film forming and form the flexible apparatus shown in, for instance, FIG. 14. The waterproof thin film 510 of FIG. 14 completely covers the outside of the flexible apparatus, and can further strengthen the functions of waterproofing and antifouling of the flexible apparatus.

Figure 15:
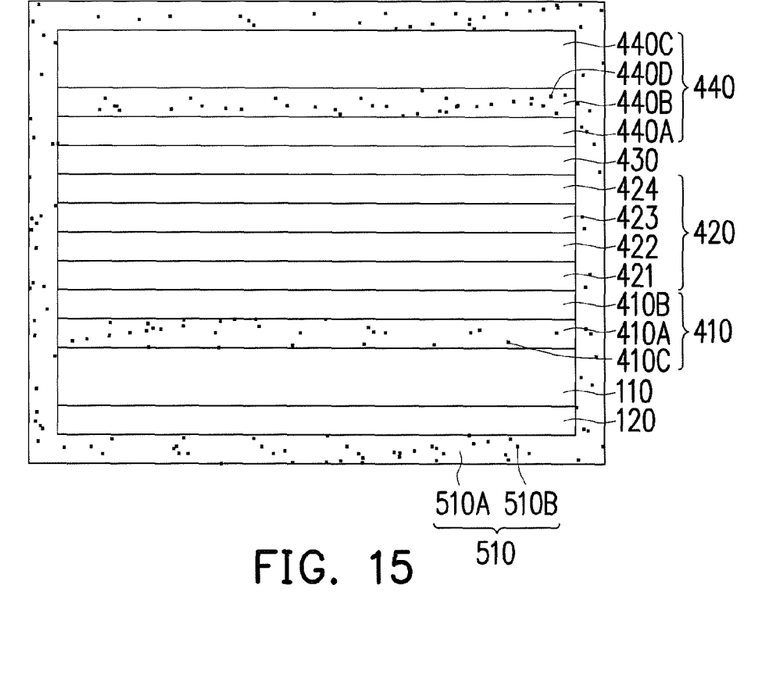
FIG. 15 is a flexible apparatus according to another embodiment of the disclosure.

FIG. 15 is a flexible apparatus according to another embodiment of the disclosure. The embodiment shown in FIG. 15 is similar to the embodiment shown in FIG. 14, and therefore the same devices are represented by the same reference numerals and are not repeated herein. The waterproof thin film 510 shown in FIG. 15 includes a hydrophobic material 510A and a plurality of nanoparticles 510B. The nanoparticles 510B of FIG. 15 can include silicon oxide or aluminum oxide nanoparticles, but are not limited thereto. Based on the above, the silicon oxide or aluminum oxide nanoparticles can be formed by, for instance, a sol-gel method. In the present embodiment, the flexible apparatus 900 shown in, for instance, FIG. 10, is dipped in a solution of the hydrophobic material 510A and the nanoparticles 510B such that the hydrophobic material 510A and the nanoparticles 510B can completely cover the flexible apparatus 900 after film forming and form the flexible apparatus shown in, for instance, FIG. 15. The waterproof thin film 510 of FIG. 15 completely covers the outside of the flexible apparatus, and can further strengthen the functions of waterproofing, water blocking, oxygen blocking, and antifouling of the flexible apparatus.

A composite plate structure in an embodiment of the disclosure may have a release layer, and the release layer is bonded to a flexible substrate through a bonding material. When the flexible substrate is peeled from the carrier plate, the release layer and the flexible substrate are separated from the carrier plate together. The release layer may include one of a hydrophobic material, a water-blocking material, and a plurality of nanoparticles or a combination thereof, and may provide the functions of waterproofing, water blocking, oxygen blocking, and antifouling to the composite plate structure.

In the flexible apparatus including the composite plate structure, the release layer is disposed on the lower surface of the flexible substrate, and may delay the penetration of water vapor to the device layer, thus extending the service lifetime of the electronic device. A flexible apparatus of an embodiment of the disclosure may further include one of a waterproof layer, a cover, a side cover, and a waterproof thin film or a combination thereof. The waterproof layer, the cover, the side cover, or the waterproof thin film may optionally include a hydrophobic material, a water-blocking material, and/or a plurality of nanoparticles. Therefore, the functions of waterproofing, water blocking, oxygen blocking, and antifouling of the flexible apparatus may be further strengthened. Those having ordinary skill in the art should understand that, the flexible apparatus of the embodiments of the disclosure may arbitrarily adopt one of a hydrophobic material, a water-blocking material, and a plurality of nanoparticles or a combination thereof in a release layer, a waterproof layer, a cover, a side cover, or a waterproof thin film, or adjust the arrangement of the nanoparticles in the belonging layer to achieve a flexible apparatus having the desired efficacy.

It will be clear that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A composite plate structure, comprising:
 a flexible substrate, wherein the flexible substrate has an upper surface and a lower surface;
 a release layer disposed on a lower surface of the flexible substrate, wherein a material of the release layer comprises:
  a hydrophobic material, wherein the hydrophobic material comprises at least one fluorine atom;
  a bonding material, wherein the bonding material at least comprises an amide functional group or an epoxy functional group, and the bonding material is bonded to the flexible substrate through the amide functional group or the epoxy functional group; and
  where the hydrophobic material comprises at least one of formula 1 to formula 2 below:

(formula 1)

(formula 2)

2. The composite plate structure of claim 1, wherein the bonding material comprises one of formula 3 to formula 12 below:

(formula 3)

(formula 4)

(formula 5)

(formula 6)

-continued

(formula 7)

(formula 8)

(formula 9)

(formula 10)

(formula 11)

(formula 12)

3. The composite plate structure of claim 1, wherein the release layer further comprises a plurality of nanoparticles, and the nanoparticles comprise silicon oxide or aluminum oxide.

4. The composite plate structure of claim 1, wherein the release layer further comprises a water-blocking material, and the water-blocking material and the hydrophobic material form a stacked layer.

5. The composite plate structure of claim 1, further comprising a carrier plate, and the release layer is disposed between the flexible substrate and the carrier plate.

6. A flexible apparatus, comprising:
a flexible substrate, wherein the flexible substrate has an upper surface and a lower surface;
a device layer disposed on an upper surface of the flexible substrate;
a release layer disposed on a lower surface of the flexible substrate, wherein a material of the release layer comprises:
  a hydrophobic material, wherein the hydrophobic material comprises at least one fluorine atom;
  a bonding material, wherein the bonding material at least comprises an amide functional group or an epoxy functional group, and the bonding material is bonded to the flexible substrate through the amide functional group or the epoxy functional group; and
wherein the hydrophobic material comprises at least one of formula 1 to formula 2 below:

(formula 1)

(formula 2)

7. The flexible apparatus of claim 6, wherein the bonding material comprises at least one of formula 3 to formula 12 below:

(formula 3)

(formula 4)

(formula 5)

-continued

8. The flexible apparatus of claim 6, wherein the release layer further comprises a plurality of nanoparticles, and the nanoparticles comprise silicon oxide or aluminum oxide.

9. The flexible apparatus of claim 6, further comprising a waterproof layer located between the flexible substrate and the device layer, wherein the waterproof layer comprises a hydrophobic material and a water-blocking material, and the hydrophobic material and the water-blocking material form a stacked layer.

10. The flexible apparatus of claim 6, further comprising a waterproof layer located between the flexible substrate and the device layer, wherein the waterproof layer comprises a hydrophobic material and a plurality of nanoparticles, and the nanoparticles are located in the hydrophobic material.

11. The flexible apparatus of claim 6, further comprising a waterproof layer located between the flexible substrate and the device layer, wherein the waterproof layer comprises a hydrophobic material, a water-blocking material, and a plurality of nanoparticles, the hydrophobic material and the water-blocking material form a stacked layer, and the nanoparticles are located in the hydrophobic material.

12. The flexible apparatus of claim 6, further comprising a cover disposed above the device layer, wherein the cover comprises a hydrophobic material and a water-blocking material, and the hydrophobic material and the water-blocking material form a stacked layer.

13. The flexible apparatus of claim 6, further comprising a cover disposed above the device layer, wherein the cover comprises a hydrophobic material and a plurality of nanoparticles, and the nanoparticles are located in the hydrophobic material.

14. The flexible apparatus of claim 6, further comprising a cover disposed above the device layer, wherein the cover comprises a hydrophobic material, a water-blocking material, and a plurality of nanoparticles, the hydrophobic material and the water-blocking material form a stacked layer, and the nanoparticles are located in the hydrophobic material.

15. The flexible apparatus of claim 6, further comprising at least one side cover covering at least one side of the flexible apparatus, wherein the at least one side cover comprises a hydrophobic material and a water-blocking material, and the hydrophobic material and the water-blocking material form a stacked layer.

16. The flexible apparatus of claim 6, further comprising at least one side cover covering at least one side of the flexible apparatus, wherein the at least one side cover comprises a hydrophobic material and a plurality of nanoparticles, and the nanoparticles are located in the hydrophobic material.

17. The flexible apparatus of claim 6, further comprising at least one side cover covering at least one side of the flexible apparatus, wherein the at least one side cover comprises a hydrophobic material, a water-blocking material, and a plurality of nanoparticles, the hydrophobic material and the water-blocking material form a stacked layer, and the nanoparticles are located in the hydrophobic material.

18. The flexible apparatus of claim 6, further comprising a waterproof thin film, wherein the waterproof thin film covers an outside of the flexible apparatus, and the waterproof thin film comprises a hydrophobic material and a plurality of nanoparticles.

* * * * *